United States Patent [19]
Essers et al.

[11] 3,891,824
[45] June 24, 1975

[54] METHOD OF PLASMA-MIG-WELDING

[75] Inventors: Wilhelmus Gerardus Essers; Gerardus Jelmorini, both of Emmasingel, Eindhoven, Netherlands

[73] Assignee: U.S. Philips Corporation, New York, N.Y.

[22] Filed: Nov. 23, 1973

[21] Appl. No.: 418,296

Related U.S. Application Data

[63] Continuation of Ser. No. 237,391, March 23, 1972, abandoned.

[30] Foreign Application Priority Data
Apr. 1, 1971 Netherlands.................... 7104337

[52] U.S. Cl................ 219/121 P; 219/130; 219/74; 219/137
[51] Int. Cl............................................. B23k 9/00
[58] Field of Search ........... 219/121 P, 131 R, 137, 219/135, 74, 130; 315/111; 313/231

[56] References Cited
UNITED STATES PATENTS

| | | | |
|---|---|---|---|
| 3,122,629 | 2/1964 | Manz | 219/74 |
| 3,309,564 | 3/1967 | Poulsen | 315/111 |
| 3,588,464 | 6/1971 | Saenger, Jr. | 219/130 |
| 3,683,149 | 8/1972 | Mages et al. | 219/137 |
| 3,692,973 | 9/1972 | Oku et al. | 219/121 P |

*Primary Examiner*—J. V. Truhe
*Assistant Examiner*—G. R. Peterson
*Attorney, Agent, or Firm*—Frank R. Trifari

[57] ABSTRACT

A method of plasma-MIG-welding in which welding is carried out with the electrode and the welding wire connected to the positive terminal; by varying the current in the welding wire, a variation of the character of the MIG-arc and of the way of material transfer are obtained; at low current in the welding wire, a MIG-arc with a contracted cylindrical shape and a concentrated material transfer is obtained; at high current a rotating MIG-arc and a controlled, spread material transfer are obtained.

4 Claims, 6 Drawing Figures

METHOD OF PLASMA-MIG-WELDING

This is a continuation of application Ser. No. 237,391, filed Mar. 23, 1972 now abandoned.

The invention relates to a method of plasma-MIG-welding, in which an arc is maintained in a gas flow between a workpiece and a non-consumable electrode, the arc plasma is constricted by a nozzle, a current carrying welding wire is fed axially into the arc plasma and a MIG-arc is maintained between the welding wire and the workpiece.

With such a known method, a high deposition rate of the welding wire and hence a high welding speed is obtained with a comparatively small penetration of the workpiece and a good flow of the weld as a result of the axial supply of the welding wire in the arc plasma. In this known method of plasma welding it is usual to carry out the welding operation with the electrode and the welding wire connected to the negative terminals. In that case the MIG-arc has the shape of a cone with a small apical angle. This shape of the MIG-arc does substantially not vary when the current in the welding wire is varied.

It is the object of the invention to provide a method of plasma-MIG-welding which has wider application possibilities than the known method.

According to the invention this object is mainly achieved in that welding is carried out with the electrode and the welding wire connected to the positive terminal, a variation of the character of the MIG-arc and of the way of material transfer being obtained by variation of the current in the welding wire.

Several ways of material transfer can be obtained with the electrode and the welding wire connected to the positive terminal by variation of the current in the welding wire: in the case of low current through the welding wire, a drop-like transfer (globular transfer) of the material takes place which, when the current is increased, changes without a sharp boundary gradually into an axial transfer of very small droplets (axial spray transfer); when a critical value of the current through the welding wire is reached, hereinafter termed transition current, this way of transfer changes into a rotating transfer of very small droplets (rotating spray transfer).

It is to be noted that in MIG-welding it is known per se to weld with the welding wire connected to the positive terminal in which the three described ways of material transfer can also be achieved by variation of the current in the welding wire. The practical usefulness of said known method is restricted to a small range of current through the welding wire with comparatively short extension lengths of the welding wire. In contrast with the method according to the invention, the process cannot be carried out in a controlled manner at currents above the transition current.

The conical MIG-arc obtained by the already mentioned known method of plasma-MIG-welding results in a comparatively small penetration of the workpiece. In contrast herewith, in a preferred embodiment of the method according to the invention a narrow weld with a deep penetration of the workpiece is obtained in that welding is carried out at such a low current in the welding wire that a non-rotating MIG-arc with a contracted cylindrical shape and a concentrated material transfer is obtained. This embodiment of the method according to the invention is particularly suitable for welding thin workpieces at a very high welding speed.

According to another preferred embodiment of the method according to the invention, welding is carried out at such a high current in the welding wire, that a rotating MIG-arc and a controlled, spread material transfer are obtained. By increasing the current in the welding wire, the originally cylindrical, non-rotating MIG-arc upon reaching the transition current suddenly changes into a rotating MIG-arc which describes the surface of a cylinder in the enveloping plasma. Experiments have surprisingly demonstrated that the plastic end of the welding wire is deformed spirally and describes a conical surface in the enveloping arc plasma, the MIG-arc which engages at the end of the welding wire describing a cylindrical surface; the material transfer to the workpiece occurs in such manner that a wide weld with a very small but uniform penetration occurs with negligible spatter. This in contrast with the already mentioned MIG-welding in which at currents in the welding wire which are only slightly higher than the transition current, the material is spewed away laterally by rotation, as a result of which this process is not useful in practice for high currents. The abovementioned embodiment of the method according to the invention can be used advantageously for the deposition of a metal layer on a workpiece, in which at a large deposition rate of the welding wire a proportionally wide and flat surfacing is obtained.

For carrying out the method according to the invention is used a known device comprising a welding torch having a housing with a nozzle provided with a plasma aperture, a non-consumable electrode and means to feed the welding wire through the centre of the plasma aperture, said device furthermore comprising two current supply sources which can be controlled independently of each other. According to the invention this device is characterized by means for connecting the welding wire to the positive terminal of one supply source and for connecting the electrode to the positive terminal of the other supply source, the feeding rate of the welding wire being controllable.

In a preferred embodiment of the device according to the invention, the supply source to which the electrode can be connected shows a strongly drooping characteristic and the supply source to which the welding wire can be connected shows a flat characteristic. With the featured characteristics of the supply sources, the potential of the welding wire can be better adjusted relative to the potential of the enveloping arc plasma as a result of which the process can be more easily controlled.

In another preferred embodiment of the device according to the invention, the two supply sources form part of a common control unit.

In order that the invention will now be described in greater detail, by way of example, with reference to the accompanying drawing, in which FIG. 1 shows diagrammatically a device for carrying out the known method.

Figure 1:
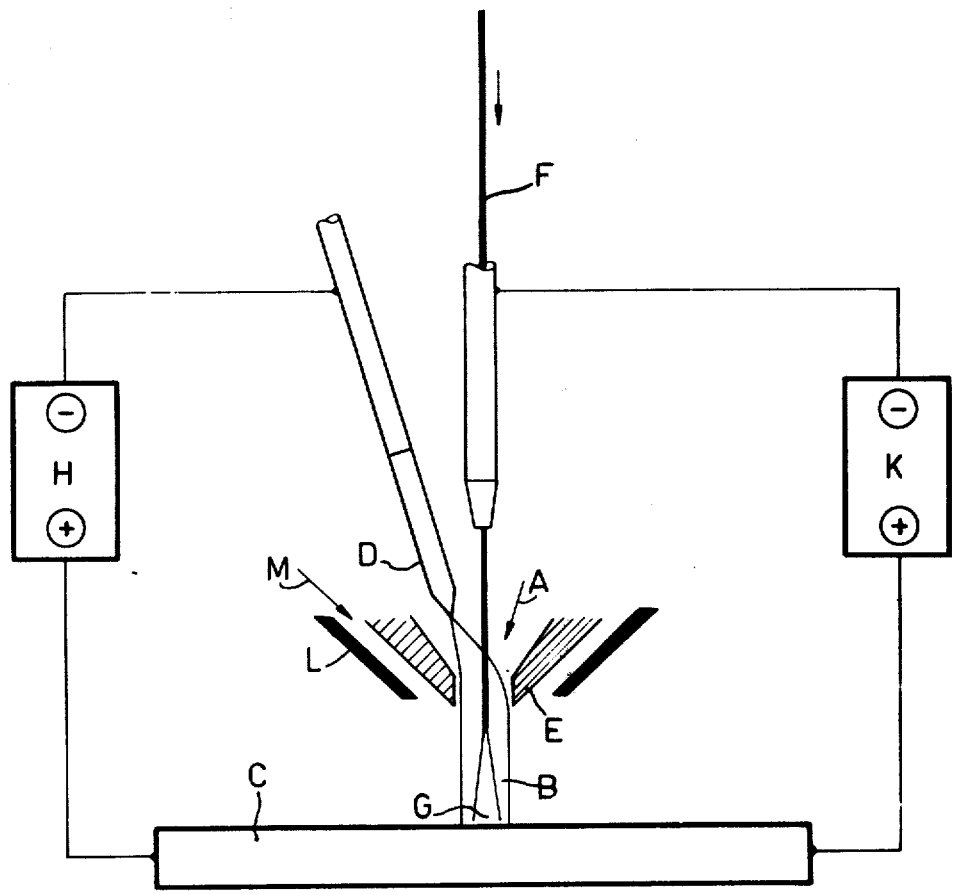

FIG. 1 shows diagrammatically a device for carrying out the known method of plasma welding, in which an arc B is maintained between a workpiece C and a non-consumable electrode D, for example of tungsten, in a gas flow A. The arc B is constricted by the nozzle E. A current carrying welding wire F is fed axially into the plasma of arc B, a MIG-arc G being maintained between the welding wire F and the workpiece C. The electrode D is connected to the negative terminal of a supply source H, while the welding wire F is connected to the negative terminal of a second supply source K; the positive terminals of the supply sources H and K are connected to the workpiece C. A shielding gas M, for example, a mixture of argon with carbon dioxide, is supplied through a nozzle L. In this method the MIG-arc G has the shape of a cone with a small apical angle as is shown in FIG. 1. When the current in the welding wire is increased, a comparatively narrow and high weld bead is obtained in which the shape of the MIG-arc remains substantially unvaried.

Figure 2:
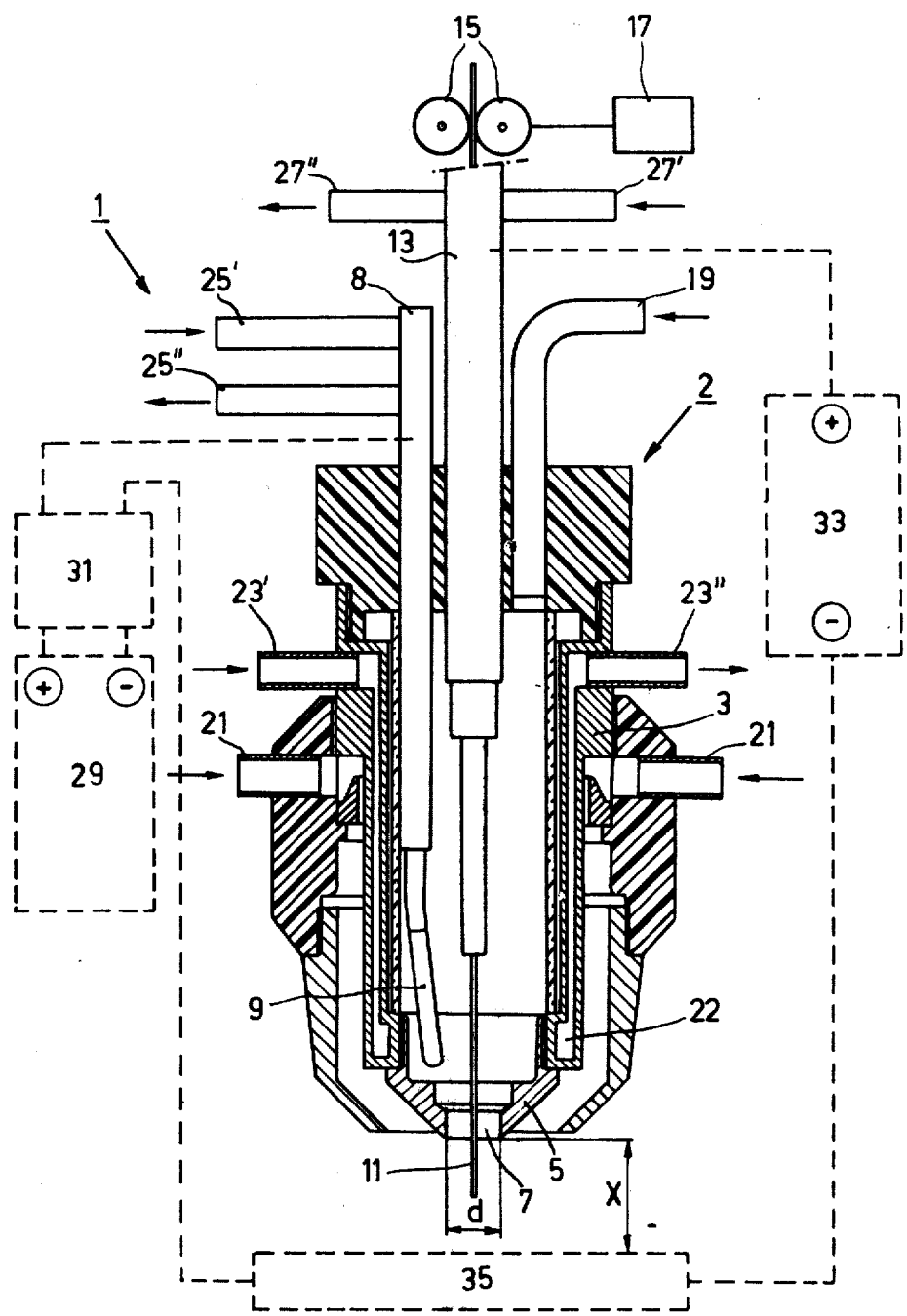
FIG. 2 shows a welding torch for carrying out the method according to the invention.

The application possibilities of the plasma-MIG welding are considerably increased by the method according to the invention in which the connection of the electrode and the welding wire to the positive terminals of the supply sources is the most striking feature. FIG. 2 shows a device 1 for carrying out the method according to the invention. This device comprises a welding torch 2 having a housing 3 which is provided with a nozzle 5 having a plasma aperture 7; an electrode holder 8 with a non-consumable electrode 9, for example of tungsten, is placed in the housing 3 eccentrically relative to the plasma aperture 7. A welding wire 11 is fed axially into the centre of the plasma aperture 7 by means of a wire guide 13; the transport of the welding wire 11 occurs by means of transport rollers 15 which are driven by a motor 17 at a controllable speed. The welding torch 2 furthermore comprises a supply duct 19 for the supply of a plasma gas, for example argon, and connections 21 for the supply of a shielding gas, for example a mixture of argon with carbon dioxide. The housing 3, the electrode holder 8 and the wire guide 13 are provided with cooling chambers, only the cooling chamber 22 of the housing being shown in the drawing; these cooling chambers communicate with connections 23', 23", 25', 25", 27', 27" for the supply and discharge of cooling water. The electrode 9 is connected to the positive terminal of a supply source 29 with a strongly drooping characteristic via a high frequency generator 31, while the welding wire 11 is connected, through the wire guide 13, to the positive terminal of a second independent supply source 33 having a flat characteristic. A workpiece 35 is connected to the negative terminals of the two supply sources 29 and 33. X denotes the distance between the nozzle 5 and the workpiece 35, and $d$ is the diameter of the plasma aperture 7.

Figure 3:
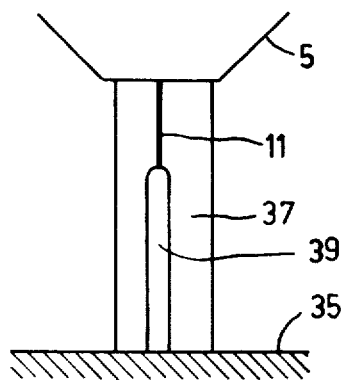
FIG. 3 shows diagrammatically the shape of the MIG-arc obtained with an embodiment of the method according to the invention.
Figure 5:
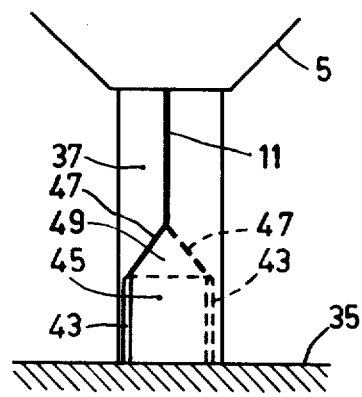
FIG. 5 shows the shape of the MIG-arc obtained with another embodiment of the method according to the invention.
Figure 4:
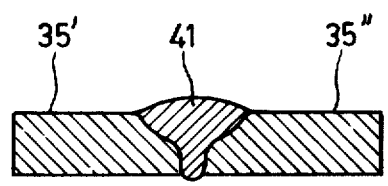
FIG. 4 shows an example of a weld obtained with the shape of arc shown in FIG. 3.

During welding with the welding torch shown in FIG. 2, a plasma-arc which is constricted by the plasma aperture 7 is maintained between the electrode 9 and the workpiece 35 in a shielding gas flow. A MIG-arc is maintained between the workpiece 35 and the welding wire 11 which is guided axially into the arc plasma and is melted. At a comparatively low current in the welding wire, the MIG-arc has the shape of a contracted non-rotating cylinder. FIG. 3 shows diagrammatically this situation in which the plasma-arc is denoted by 37 and the MIG-arc by 39. As shown in FIG. 4, said shape of the arc results in a weld of two workpieces 35' and 35" with a narrow weld bead 41 and with a deep penetration of the workpieces.

The following are the welding data of two embodiments of such a weld:

| Workpieces | mild steel plate | stainless steel |
|---|---|---|
| thickness workpieces | 1.5 mm | 8 mm |
| Shape of seam | I-seam | I-seam |
| pre-aperture | 1 mm | 1 mm |
| plasma gas | argon | argon |
| quantity of plasma gas | 6.5 litres/min | 6.5 litres/min |
| shielding gas | 80% A | 66.6% A |
|  | 15% CO$_2$ | 33.3% CO$_2$ |
|  | 5% O$_2$ |  |
| quantity of shielding gas | 15 litres/min | 15 litres/min |
| Composition welding wire in % by weight | 1.6% Mn | 20.6% Cr |
|  | 0.8% Si | 9.7% Ni |
|  | 0.1% C | 1.8% Mn |
|  | remainder Fe | 0.85% Si |
|  |  | 0.025% C |
|  |  | remainder Fe |
| Diameter welding wire | 1.6 mm | 1.2 mm |
| Diameter plasma aperture | 6 mm | 6 mm |
| Distance nozzle-workpiece | 18 mm | 15 mm |
| Current plasma arc | 105 A | 100 A |
| Current welding wire | 300 A | 190 A |
| Welding speed | 385 cm/min | 38 cm/min |
| Deposition rate | 120 gr/min | 90 gr/min. |

It appears in particular from the first embodiment that very high welding and deposition rates are possible with said method.

Figure 6:
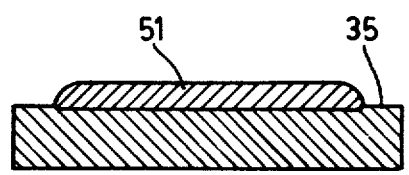
FIG. 6 shows an embodiment of a weld obtained with the shape of the arc shown in FIG. 5.

If now, starting from this situation, the current in the welding wire is gradually increased, the cylindrical non-rotating arc 39 suddenly changes into a rotating arc 43 which describes a cylindrical surface 45 at the already signalled transition current; the rotation speed of the arc 43 is so high that only a wide cylindrical beam is observable with the naked eye. This phenomenon is caused in that the end 47 of the welding wire 11 has become plastic over a length of a few millimetres, is bent laterally in the form of a spiral and rotates at a high speed to describe in this manner a conical surface 49; the MIG-arc 43 which engages at the end of the welding wire also rotates and describes in the already described manner the cylindrical surface 45 which is observable with the naked eye. This rotation of the MIG-arc is probably caused by mechanical reaction forces and by electro-magnetic forces. In addition, the magnetic field produced by the current in the arc plasma exerts a force which restricts the diameter of the track described by the MIG-arc; in the above-mentioned known method of MIG-welding this force is not present by which the occurring spatter and spewing away of the material can be explained. This shape of the arc is particularly suitable for applying a metal layer on the workpiece by surfacing with a large width of the bead and with a very small penetration of the workpiece. FIG. 6 shows a workpiece 36 with a deposition bead 51 obtained in this manner. In spite of the high rotation speed of the secondary arc 43, the material transfer to the workpiece always occurs in a very controllable manner and nearly without spatter.

In a practical embodiment of surfacing by applying stainless steel on mild steel plate, the following welding parameters were used:

| | |
|---|---|
| Plasma gas | Argon |
| quantity of plasma gas | 6.5 litres/min. |
| Shielding gas | 80%A; 20% $CO_2$ |
| Quantity of shielding gas | 15 litres/min. |
| Composition welding wire in % by weight | 20.6% Cr |
| | 9.7% Ni |
| | 1.8% Mn |
| | 0.85% Si |
| | 0.025% C |
| | remainder Fe |
| Diameter welding wire | 1.2 mm |
| Diameter plasma aperture | 10 mm |
| Distance-nozzle-workpiece | 22 mm |
| Current plasma arc | 96 A |
| Current welding wire | 400 A |
| Welding speed | 23 cm/min |
| Deposition rate | 296 g/min. |
| Height weld bead | 5 mm |
| Width weld bead | 37 mm. |

It was established by experiments that the transition current in the welding wire increases with increasing diameter of the welding wire. The following embodiments show this relation in which a flat thickening was applied on a sand-blasted mild steel plate with a welding wire of the composition 1.6% by weight Mn; 0.8% by weight Si; 0.1% by weight C; remainder Fe; 5 litres of argon per minute was used as a plasma gas and a mixture of 12 litres of argon with 3 litres of $CO_2$ per minute was used as a shielding gas; the diameter of the plasma aperture was 10 mm and the distance nozzle-workpiece 15 mm; welding was carried out at a welding rate of 25 cm/min and a current strength of the plasma arc of 125 A. The variation of the transition current in the welding wire in accordance with the diameter of the welding wire was as follows:

| Diameter welding wire in mm | Transition current in A |
|---|---|
| 0.9 | 175 ± 10 |
| 1.2 | 250 ± 10 |
| 1.6 | 330 ± 10 |

At currents above the transition current of, for example, 280 A for a welding wire having a diameter of 1.2 mm, a stable situation is obtained in which the rotation of the MIG-arc is very regular.

Experiments have moreover demonstrated that the transition takes place at comparatively low currents both at small extensions of the welding wire, in particular, however, with large extensions of approximately 35 mm and more. By extension is to be understood the part of the welding wire from the end of the guide and contact tube to the origin of the MIG-arc. In the known method the transition current with a large extension of the welding wire is low in which, however, due to excessive spatter, no useful rotating material transfer takes place. In the case of small extensions of the welding wire, the transition takes place at higher currents the current being variable within a useful range of rotating transfer; in practice, however, welding cannot be carried out with extensions of the welding wire less than 30 mm because for this purpose the contact tube has to be placed too close to the tungsten electrode and is damaged by melting as a result of thermal radiation.

It was furthermore established that the diameter of the plasma aperture also has an influence on the transition current in the welding wire. It appears from the following embodiments that when the diameter of the plasma aperture decreases, the transition current decreases. In this embodiment a welding wire was used having a diameter of 1.2 mm and a nozzle the plasma aperture of which had a diameter of 6 mm. The other welding parameters were the same as in the preceding embodiment in which the transition current, when using a welding wire having a diameter of 1.2 mm and a plasma aperture of 10 mm, was 250 A while in the present embodiment, with a plasma aperture having a diameter of 6 mm, the transition current was at 210 A.

In the method according to the invention the deposition rate increases considerably with increasing current through the welding wire. With a welding wire having a diameter of 1.4 mm, the deposition rate at a current of 300 A was 180 g/min and at a current through the welding wire of 500 A it was 570 g/min. In contrast with this the deposition rate in the known method of MIG-welding remains substantially constant with increasing current.

Measurements performed with a welding wire having a diameter of 1.2 mm and with the same above-mentioned parameters have demonstrated that the speed of rotation $\eta$ (rotations/second) mainly depends upon the current through the welding wire, the rotation speed increasing with increasing current according to the formula: $\eta = 0.53\ I + 26$, where, $I(A)$ is the current through the welding wire.

Two separate supply sources for the electrode and the welding wire are shown in the drawing. Preferably, however, the two supply sources form part of a common control unit in which both can be controlled independently of each other.

What is claimed is:

1. A method of plasma-MIG welding a workpiece, comprising the steps of feeding a stream of inert gas through a nozzle aperture towards said workpiece, generating a plasma stream by connecting a non-consumable electrode to the positive side of a current supply means and by maintaining a continuous plasma arc between said non-consumable electrode and said workpiece within said stream of inert gas, feeding a consumable weld wire axially into said plasma stream, maintaining a continuous MIG arc between said consumable wire electrode and said workpiece by connecting said electrode to the positive side of a current supply means and flowing current therethrough, while maintaining said plasma stream substantially concentrically about said MIG-arc, and varying the current through said consumable weld wire for varying the character of the MIG arc and material transfer from said weld wire.

2. A method according to claim 1 comprising varying said current in said weld wire to be relatively low, and forming said MIG arc into a non-rotating contracted cylindrical shape, with a concentrated material transfer from said consumable electrode.

3. A method according to claim 1 comprising varying said current in the weld wire to be relatively high, and forming said MIG arc into a rotating arc, and thus spreading while controlling said weld material transfer.

4. A method according to claim 1 wherein said current supply source to the weld wire has a flat characteristic, and said current supply source to the electrode has a drooping characteristic.

* * * * *